Patented Sept. 6, 1949

2,481,157

UNITED STATES PATENT OFFICE 2,481,157

TREATMENT OF HALO-HYDROCARBONS

Louis Schmerling, Riverside, Ill., assignor to Universal Oil Products Company, Chicago, Ill., a corporation of Delaware No Drawing. Application October 27, 1944, Serial No. 560,708

17 Claims. (Cl. 260—593)

This invention relates to a combination process for producing higher molecular weight unsaturated halides, ketones, aldehydes, acetals, and other organic compounds.

More specifically, the invention is concerned with a combination process which comprises reacting a saturated halide with a halo-olefin to produce a polyhalogenated saturated hydrocarbon which is then reacted with a compound having the general formula R—O—H where R is selected from the group consisting of hydrogen and alkyl radicals.

Broadly, the present invention is concerned with the treatment of a saturated halide and a halo-olefin in the presence of a metal halide catalyst of the Friedel-Crafts type to form a polyhalogenated saturated hydrocarbon which is then reacted with a compound having the general formula R—O—H where R is selected from the group consisting of hydrogen anl alkyl radicals.

In one embodiment the present invention relates to a process which comprises reacting an alkyl halide with a halo-olefin in the presence of a metal halide catalyst of the Friedel-Crafts type to form a polyhaloalkane and subjecting said polyhaloalkane to reaction with a compound having the general formula R—O—H where R is selected from the group consisting of hydrogen and alkyl radicals.

In another embodiment this invention relates to a process which comprises reacting a cycloalkyl halide with a halo-olefin in the presence of a metal halide catalyst of the Friedel-Crafts type to form a polyhalocycloalkane and subjecting said polyhalocycloalkane to reaction with a compound having the general formula R—O—H where R is selected from the group consisting of hydrogen and alkyl radicals.

For the first step of the process of my invention the saturated halides which may be employed include alkayl halides and cycloalky halides. Alternative terms for these terms are "monohaloalkanes" and "monohalocycloalkanes" or "cyclohaloparaffins." Alkyl halides may be prepared by the addition of a hydrogen halide to mono-olefinic hydrocarbons. This reaction may be effected in the presence of a catalyst, such as a metal halide of the Friedel-Crafts type, an acid such as sulfuric acid, an acid of phosphorus, etc. Such an addition of hydrogen halide to an olefin results in the production of secondary alkyl halides from normal olefins and other non-tertiary olefins containing three or more carbon atoms per molecule and in the formation of tertiary alkyl halides from tertiary olefins, such as isobutylene, trimethylethylene, etc. Primary alkyl halides which may also be used in the present process are obtainable by means such as the treatment of propanol or other primary alcohols with a hydrogen halide in the presence of a suitable catalyst such as zinc chloride, etc.

Primary alkyl bromides may be obtained from a 1-alkene, also known as an alpha-olefin, by the addition of a hydrogen bromide to the 1-alkene in the presence of peroxides or sunlight. Secondary and tertiary alcohols also react with hydrogen halides to produce alkyl halides.

Alkyl chlorides and bromides are generally preferred for condensation with halo-olefins in the first step of the process and alkyl halides containing at least three carbon atoms are especially desirable.

Furthermore, tertiary butyl halides are in general more reactive than are secondary alkyl halides which in turn are more reactive than primary alkyl halides. Accordingly, primary, secondary and tertiary alkyl halides are generally not utilizable under the same conditions as are desired to produce relatively high yields of the polyhalogenated saturated hydrocarbons mentioned above.

Halocycloalkanes, which may also be referred to as halonaphthenes, may be obtained from any suitable source. Suitable halonaphthenes include halocyclopentanes, halocyclohexanes, halodiolefins and other halogenated saturated cyclic compounds. More specific examples of these saturated cyclic halides include 1-chloro-1-methylcyclopentane, 1-chloro-1-methylcyclohexane, 9-chlorodihydronaphthalene, etc. The first two compounds may be prepared from the corresponding alcohols which may be synthesized by reaction of methyl magnesium chloride with cyclopentanone and cyclohexanone, respectively. The above mentioned chlorodecalin may be obtained by the addition of hydrogen chloride to 9,10-octalin.

Another method for making tertiary halocycloparaffins consists in adding a hydrogen halide to a double bond of a cyclo-olefin in which one of the hydrogen atoms attached to the doubly bonded carbon atoms is substituted by an alkyl group.

Secondary halocycloparaffins may be prepared either from the appropriate alcohol or by the addition of a hydrogen halide to the appropriate cyclo-olefin.

Halo-olefins which are condensed with saturated halides in the first step of my process as herein set forth contain at least one halogen atom and one double bond per molecule and comprise halo-ethenes, -propenes, -butenes, and higher haloalkenes. Vinyl chloride, allyl chloride, allyl bromide, propenyl chloride and isopropenyl chloride are representative of suitable halo-olefins containing one halogen atom and one double bond per molecule and utilizable in the present process. Dichloroethylene, 1,2-dichloropropene-1 and 1,2-dichloropropene-2 are examples of suitable halo-olefins containing more than one halogen per molecule.

Monohalo-olefins may be formed in any suitable manner such as by the action of a halogen upon an olefin at a temperature at which substitution occurs and substantially in excess of that at which the principal reaction is the addition of a halogen to the olefinic double bond. They may also be prepared by the addition of a halogen to an olefinic double bond to form a dihaloalkane from which one molecule of hydrogen halide may be removed by any one of several well known methods to produce a monohalo-olefin.

Halocyclo-olefins which may also be used in the present process include particularly monohalocyclopentenes and monohalocyclohexenes. These halogenated compounds may be prepared by adding a halogen to a cyclo-olefin to form a dihalocycloparaffin and then eliminating one molecule of hydrogen halide from said dihalocycloparaffin. Monohalocyclo-olefins may also be prepared by splitting out the elements of water from a halohydrin as well as by other methods. Examples of suitable monohalocyclo-olefins are 1-chloro-1-cyclohexene, 1-chloro-2-cyclohexene, 1-chloro-1-cyclopentene, 1-chloro-2-methyl-2-cyclopentene, etc. The different halo-olefins and halocyclo-olefins which may be employed in the present process are not necessarily used under the same conditions of operations or with completely equivalent results.

Catalysts of the Friedel-Crafts type which may be used in effecting the interaction of a saturated halide with a halo-olefin of the type herein described include metal chlorides and bromides and particularly aluminum chloride, ferric chloride, zirconium chloride, bismuth chloride and zinc chloride. Boron fluoride is also suitable. Of these catalytic materials, aluminum chloride is generally more widely applicable as it possesses substantial catalytic activity at relatively low temperatures.

The metal halides of the Friedel-Crafts type are preferably employed at temperatures between about $-30°$ and about $+25°$ C., although higher temperatures, generally not in excess of about $100°$ C., are also sometimes utilizable. The temperatures used will depend upon the particular catalyst as well as on the reactants. In general, when employing a catalyst of the Friedel-Crafts type, temperatures from about $-30$ to about $125°$ C. are used. With aluminium chloride, temperatures from about $-30$ to about $+10°$ C. are most suitable while with a moderately active catalyst such as bismuth chloride a temperature of between about 20 and about $100°$ C., and preferably from about 20 to about $80°$ C. is employed.

The metal halide catalysts of the Friedel-Crafts type may be employed as such, as mixtures, or supported by carriers such as alumina, diatomaceous earth, clay, pumice, activated charcoal, etc. Materials so utilizable as carriers should have substantially no harmful effect on the catalyst activity of the metal halide or mixture of metal halides employed. In some instances, the catalyst may be dissolved in a suitable solvent such as a nitroparaffin or ether.

Thus, in a batch type operation, a halo-olefin is added gradually to a reactor containing a saturated halide and a Friedel-Crafts type metal halide catalyst. The reaction mixture is maintained at the desired temperature while sufficient pressure is maintained to keep a substantial proportion of the reactants in liquid phase. The reaction mixture is agitated by stirring, shaking, or other suitable means to effect intimate contact of the reactants and catalyst. During this treatment, the saturated halide combines chemically with the halo-olefin to produce a polyhalogenated saturated hydrocarbon, the number of carbon atoms in which is equal to the sum of the carbon atoms present in one molecule each of the reacting saturated halide and halo-olefin.

In another method of operation, a mixture of a halo-olefin, saturated halide and catalyst which has been cooled to a temperature well below that at which reaction occurs, may be gradually warmed to the reaction temperature while subjecting the mixture to continuous agitation.

After such a batch type operation, the normally liquid products are separated from the catalyst and the latter is returned to further use in the condensation reaction zone. In some cases, it is desirable to commingle hydrogen with the reaction mixture since it has a tendency to increase the active life of the catalyst. Hydrogen halide present in the reaction products may be returned to the process or utilized for some other purpose as desired.

Continuous condensation of the saturated halide with a halo-olefin may be carried out by introducing a mixture of the halo-olefin, also referred to as an unsaturated halide, and the saturated halide to a circulating suspension in an inert diluent such as a normal paraffin of the metal halide catalyst, particularly aluminum chloride or another compound of the Friedel-Crafts type, or the catalyst may be circulated in the form of a solution in nitromethane or ether. The mixture of saturated halide, halo-olefin, catalyst and diluent or solvent and sometimes hydrogen or hydrogen halide is directed through a mixer or through a reactor containing packing material to effect intimate contact of the catalyst with the reactants. The condensation temperature and pressure employed in such condensation treatment are within the limits indicated above, but specific conditions used in any given condensation reaction vary with the molecular weights and reactivity of the reactants, the concentration and activity of the catalyst employed and other factors.

The treatment of the polyhaloalkane or polyhalocycloalkane with a compound of the general formula R—O—H is carried out at a temperature from about $50°$ to about $350°$ C. and preferably from about $180°$ to about $300°$ C. Suitable compounds having the formula R—O—H include water, methanol, ethanol, etc. Beneficial results are sometimes obtained by effecting the reaction in the presence of alkaline substances such as sodium hydroxide, sodium bicarbonate or magnesium hydroxide.

The type of product obtained by means of my process will depend largely on the halo-olefin employed in the first step and on the particular compound having the formula R—O—H used in the final step. The following equations show the formation of typical intermediates in the first step of the combination.

CH₃—CHCl—CH₃+CH₂=CH—Cl→
　　　　(CH₃)₂CH—CH₂—CHCl₂　(A)
(CH₃)₃CCl+CH₂=CH—CH₂Cl→
　　　　(CH₃)₃C—CH₂—CHCl—CH₂Cl　(B)
C₂H₅—C(CH₃)₂Cl+CH₂=CCl—CH₃→
　　　　C₂H₅—C(CH₃)₂—CH₂—CCl₂—CH₃　(C)
(CH₃)₃CBr+CH₂=CH—CHBr—CH₃→
　　　　(CH₃)₃C—CH₂—CHBr—CHBr—CH₃　(D)
(CH₃)₃CCl+CH₂=CCl—CH₂Cl→
　　　　(CH₃)₃C—CH₂—CCl₂—CH₂Cl　(E)

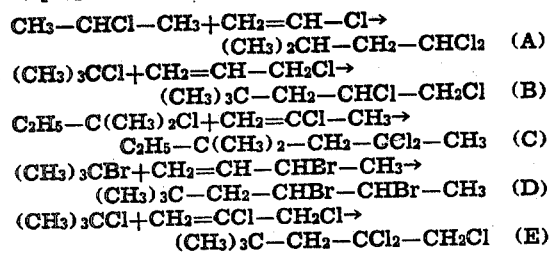

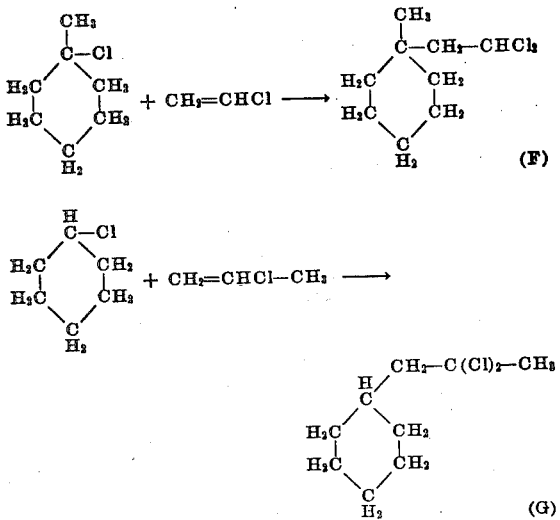

When the compound of the formula R—O—H used to treat the intermediate material comprises water, the major products will be formed as follows: (Small amounts of halo-olefins may be formed as by-products.)

The reaction of dichlorides having both halogen atoms on the same primary carbon atom in the presence or absence of added acidic or alkaline compounds will yield an aldehyde as the principal product. Compounds A and F will thus yield isovaleraldehyde and 1-methylcyclohexylacetaldehyde, respectively. The reaction of dihalides having both halogen atoms on the same secondary carbon atom will yield ketones. Thus compounds C and G, will yield 4,4-dimethylhexanone-2 and cyclohexylacetone, respectively. Compounds such as B which have halogens on adjacent carbon atoms, one of which is a primary carbon atom, will usually yield a mixture of aldehydes and ketones. In the presence of a basic substance the product is likely to be a glycol. Compounds such as D which contain halogen atoms on adjacent carbon atoms, neither of which is primary, yields either a ketone or a glycol, depending upon the reaction conditions used. In the presence of acidic substances or if water alone is used, the product will usually be a ketone while in the presence of a basic substance the product will be a glycol. A polyhalide such as E usually yields a halo- or hydroxy- ketone or aldehyde.

When an alcohol comprises the compound of the formula R—O—H employed in the second step of my process the reactions will occur as follows:

When the polyhalides A through E are heated with an alcohol such as methyl alcohol the product is usually a halo-olefin. Thus compound A, for example, will yield 1-chloro-3-methylbutene-1; compounds B and C will yield primarily isomeric chloroheptenes; etc. With a polyhalide such as compound E the product will be a polyhalo-olefin.

By-products of the treatment of a polyhalide with methyl alcohol are methyl chloride and methyl ether, the latter being formed by the interaction of methanol with methyl chloride. Under milder conditions of temperature and pressure the product may be an acetal or a halomethylether.

Similar reactions are obtained with other alcohols and particularly with primary alcohols. With some alcohols, such as tertiary butyl alcohol, dehydration of a substantial amount of the alcohol may occur so that the product contains not only aldehydes but also hydrolysis products, namely, aldehydes and ketones, as hereinabove set forth. Under more severe conditions of temperature and pressure and particularly in the presence of basic substances such as potassium hydroxide, the reaction of dihalides such as A through G yields acetylenic or diolefinic hydrocarbons, with small amounts of aldehydes and ketones being formed as by-products.

The types of products which can be obtained by the present process are illustrated in the following examples, which are not, however, intended to limit unduly the generally broad scope of the invention. It will be noted that the process makes possible the ready preparation of desirable compounds which are not otherwise easily obtained.

Example I

A mixture of 100 grams of tertiary butyl chloride, 52 grams of vinyl chloride and 10 grams of ferric chloride in a cooled glass liner was sealed into a rotating autoclave which was then rotated at room temperature for 4 hours after which it was allowed to set for 16 hours and was then opened. The liquid product was decanted from the catalyst, washed, dried and distilled. There was obtained a 77% of the theoretical yield of 1,1-dichloro-3,3-dimethylbutane, boiling at 57° C. at 30 mm. pressure (148° C. at atmospheric pressure) and having a refractive index, $n_D^{20}$, of 1.4389. A sealed tube containing 14 grams of the dichlorodimethylbutane and 30 cc. of water was heated at 300° C. for 4 hours. The dichloride was converted to t-butylacetaldehyde, boiling at 101–103° C., which was characterized by preparation of its 2,4-dinitrophenylhydrazone and dimedon derivatives which melted at 146–147° C. and 162–163° C., respectively.

Example II 1,1-dichloro-3-methylbutane was obtained in 35% of the theoretical yield by bubbling vinyl chloride into a well-stirred mixture of isopropyl chloride and aluminum chloride at —20 to —30° C. The dichloromethylbutane boiled at 48–49° C. at 40 mm. pressure or at 127–128° C. at atmospheric pressure; its refractive index, $n_D^{20}$, was 1.4344. When a pentane solution containing 13 cc. of the dichloride was heated at 200–230° C. with a suspension of 6 grams of magnesium oxide in 150 cc. of water, the dichloride was converted in practically quantitative yield to isovaleraldehyde which was identified as its 2,4-dinitrophenylhydrazone derivative, melting at 123° C.

Example III

The reaction of tertiary butyl chloride with 2-chloropropene in the presence of aluminum chloride at —20 to +10° C. resulted in a 50% of the theoretical yield of 2,2-dichloro-4,4-dimethylpentane, which boiled at 58° C. at 19 mm. pressure and at 160° C. at atmospheric pressure and which had a refractive index, $n_D^{20}$, of 1.4480.

A sealed tube containing 20 cc. of the dichlorodimethylpentane and 100 cc. of water was heated at 200° C. for 4 hours. There was recovered 155 cc. of a yellow oil, over 90% of which boiled at 120–124° C. and had a refractive index, $n_D^{20}$, of 1.4130. The 2,4-dinitrophenylhydrazone and the semicarbazone derivatives of the product melted at 100° C. and 176° C., respectively, proving that the product was predominantly methyl neopentyl ketone (i. e. 4,4-dimethyl-2-pentanone).

When 14.5 grams of 2,2-dichloro-4,4-dimethylpentane was heated with 40 grams of methanol at 200° C. there was produced 8 grams of a chloroheptene and 13.5 grams of a mixture of methyl chloride and methyl ether. The chloroheptene boiled at 119–120° C. and had a refractive index, $n_D^{20}$, of 1.4275; it yielded no derivative when treated with 2,4-dinitrophenylhydrazone or semicarbazide.

*Example IV*

2,2-dichloro-4,4-dimethylhexane (a new compound) was prepared by the condensation of tertiary amyl chloride with 2-chloropropene in the presence of ferric chloride at 0° C. or aluminum chloride at -10° C. It boiled at 62–66° C. at 8mm. pressure (about 189° C. at atmospheric pressure) and had a refractive index, $n_D^{20}$, of 1.4565. Hydrolysis of this dichlorodimethylhexane by heating with water at 225° C. yielded a ketone boiling at 149–150° C. and having a refractive index, $n_D^{20}$, of 1.4187; the ketone yelded a 2,4-dinitrophenylhydrazone and a semicarbazone melting at 75° C. and 170° C., which melting points are in excellent agreement with those reported in the literature for 4,4-dimethyl-2-hexanone. When the dichlorodimethylhexane was heated at 200° C. with methanol, there was obtained a chlorooctene fraction boiling at 146–148° C., and having a refractive index, $n_D^{20}$, of 1.4381, which consisted largely of 2-chloro-4,4-dimethylhexene-2.

*Example V*

The reaction of chlorocyclohexane with vinyl chloride at −15 to +35° C. in the presence of aluminum chloride resulted in a 38% yield of 1,1-dichloro-2-cyclohexylethane, a new compound, which boiled at 87° C. at 8mm. pressure and 214° C. at atmospheric pressure and had a refractive index, $n_D^{20}$, of 1.4810. When 13 grams of this dichloride was heated with 4 grams of magnesium oxide and 100 grams of water at 250° C., there was obtained an excellent yield of cyclohexylacetaldehyde, boiling at 35–37° C. at 3mm. pressure and having a refractive index, $n_D^{20}$, of 1.467.

*Example VI*

The condensation of 1-chloro-1-methylcyclohexane with vinyl chloride at −10° to +23° C. in the presence of aluminum chloride yielded 1-(β,β-dichloroethyl)-1-methylcyclohexane, a new compound boiling at 100–102° C. at 12mm. pressure (225–227° C. at atmospheric pressure) and having a refractive index, $n_D^{20}$, of 1.4858. Hydrolysis of this dichloride by heating with water and magnesium oxide at 225° C. yielded an aldehyde boiling at 79–83° C. at 12mm. pressure and having an index of refraction, $n_D^{20}$, of 1.4728. This aldehyde, which was 1-methylcyclohexylacetaldehyde, yielded a 2,4-dinitrophenylhydrazone melting at 84–85° C.

I claim as my invention:

1. A process which comprises reacting a monohaloalkane having at least three carbon atoms per molecule with a halo-olefin in the presence of a metal halide catalyst of the Friedel-Crafts type to produce a polyhaloalkane and reacting said polyhaloalkane with a hydroxy compound selected from the group consisting of water and aliphatic alcohols.

2. A process which comprises reacting a monohalocycloalkane with a halo-olefin in the presence of a metal halide catalyst of the Friedel-Crafts type to produce a polyhalocycloalkane and reacting said polyhalocycloalkane with a hydroxy compound selected from the group consisting of water and aliphatic alcohols.

3. A process which comprises reacting a monohalide of a saturated hydrocarbon having at least 3 carbon atoms per molecule with a halocycloolefin in the presence of a Friedel-Crafts metal halide catalyst to form a polyhalogenated saturated hydrocarbon and reacting said polyhalogenated saturated hydrocarbon with a hydroxy compound selected from the group consisting of water and aliphatic alcohols.

4. A process which comprises reacting a monohalide of a saturated hydrocarbon having at least 3 carbon atoms per molecule with a mono-halo-olefin in the presence of a Friedel-Crafts metal halide catalyst to produce a dihalogenated saturated hydrocarbon and subjecting said dihalogenated saturated hydrocarbon to hydrolysis.

5. A process which comprises reacting a monohalide of a saturated hydrocarbon having at least 3 carbon atoms per molecule with a halo-olefin in the presence of a Friedel-Crafts metal halide catalyst to produce a polyhalogenated saturated hydrocarbon and subjecting said polyhalogenated saturated hydrocarbon to alcoholysis.

6. A process which comprises reacting a tertiary monohaloalkane of a saturated hydrocarbon with a halo-olefin in the presence of a metal halide catalyst of the Friedel-Crafts type to produce a polyhaloalkane and subjecting said polyhaloalkane to reaction with a hydroxy compound selected from the group consisting of water and aliphatic alcohols.

7. A process which comprises reacting a secondary monohaloalkane with a halo-olefin in the presence of a metal halide catalyst of the Friedel-Crafts type to produce a polyhaloalkane and subjecting said polyhaloalkane to reaction with a hydroxy compound selected from the group consisting of water and aliphatic alcohols.

8. A process which comprises reacting a primary monohaloalkane having at least three carbon atoms per molecule with a halo-olefin in the presence of a metal halide catalyst of the Friedel-Crafts type to produce a polyhaloalkane and subjecting said polyhaloalkane to reaction with a hydroxy compound selected from the group consisting of water and aliphatic alcohols.

9. A process which comprises reacting a monochlorinated saturated hydrocarbon having at least 3 carbon atoms per molecule with a monochloro-olefin in the presence of a metal halide catalyst of the Friedel-Crafts type to produce a dichlorinated saturated hydrocarbon and subjecting said dichlorinated saturated hydrocarbon to reaction with a hydroxy compound selected from the group consisting of water and aliphatic alcohols.

10. A process for the manufacture of an aldehyde which comprises reacting a mnohalide of a saturated hydrocarbon having at least 3 carbon atoms per molecule with a mono-halo-olefin in the presence of a Friedel-Crafts metal halide catalyst to form a dihalogenated saturated hydrocarbon having at least one halogen atom attached to a primary carbon atom and reacting said dihalogenated saturated hydrocarbon with water to produce the desired aldehyde.

11. A process for the manufacture of a ketone which comprises reacting a monohalide of a saturated hydrocarbon having at least 3 carbon atoms per molecule with a halo-olefin in the presence of a Friedel-Crafts metal halide catalyst to form a polyhalogenated saturated hydrocarbon having at least one halogen atom attached to the secondary carbon atom and reacting said polyhalogenated saturated hydrocarbon with water to produce the desired ketone.

12. A process which comprises reacting a monohalide of a saturated hydrocarbon having at least 3 carbon atoms per molecule with a halo-olefin in the presence of a Friedel-Crafts metal halide catalyst to form a polyhalogenated saturated hydrocarbon and reacting said polyhalogenated saturated hydrocarbon with an alcohol to produce a halo-olefin having a higher molecular weight than the halo-olefin reacted with said saturated monohalide.

13. A process which comprises reacting a monohalide of a saturated hydrocarbon having at least 3 carbon atoms per molecule with a mono-halo-olefin in the presence of a metal halide catalyst of the Friedel-Crafts type at a temperature from about −30 to about 125° C. to form a dihalogenated saturated hydrocarbon and reacting said dihalogenated saturated hydrocarbon at a temperature from about 50 to about 350° C. with a hydroxy compound selected from the group consisting of water and aliphatic alcohols.

14. A process for preparing tertiary butylacetaldehyde which comprises reacting tertiary butyl chloride with vinyl chloride in the presence of a catalyst comprising ferric chloride to form 1,1-dichloro-3,3-dimethylbutane and treating said 1,1-dichloro-3,3-dimethylbutane with water to yield the desired tertiary butylacetaldehyde.

15. A process for the manufacture of 1-methylcyclohexylacetaldehyde which comprises reacting 1-chloro-1-methylcyclohexane and vinyl chloride in the presence of a metal halide catalyst of the Friedel-Crafts type to form 1-($\beta,\beta$-dichloroethyl)-1-methylcyclohexane and treating said 1-($\beta,\beta$-dichloroethyl)-1-methylcyclohexane with water to yield the desired 1-methylcyclohexylacetaldehyde.

16. A process which comprises reacting tertiary amyl chloride with 2-chloropropene in the presence of a metal halide catalyst of the Friedel-Crafts type to form 2,2-dichloro-4,4-dimethylhexane and heating said 2,2-dichloro-4,4-dimethylhexane with a hydroxy compound selected from the group consisting of water and aliphatic alcohols.

17. A process which comprises reacting a monohalide of a saturated hydrocarbon having at least three carbon atoms per molecule with a mono-halo-olefin in the presence of a Friedel-Crafts metal halide catalyst to form a dihalogenated saturated hydrocarbon and reacting the last-named compound with a hydroxy compound selected from the group consisting of water and aliphatic alcohols.

LOUIS SCHMERLING.

REFERENCES CITED

The following references are of record in the file of this patent:

UNITED STATES PATENTS

| Number | Name | Date |
| --- | --- | --- |
| 2,068,772 | Sixt | Jan. 26, 1937 |
| 2,181,297 | Britton | Nov. 28, 1939 |
| 2,304,239 | Buc | Dec. 8, 1942 |
| 2,354,512 | Furch | July 25, 1944 |
| 2,359,459 | Anderson | Oct. 3, 1944 |
| 2,399,512 | Schmerling | Apr. 30, 1946 |

FOREIGN PATENTS

| Number | Country | Date |
| --- | --- | --- |
| 335,210 | Italy | Feb. 3, 1936 |
| 424,659 | Great Britain | Feb. 26, 1935 |
| 460,143 | Great Britain | Jan. 15, 1937 |

OTHER REFERENCES

Beilstein "Handbuch der Organischer Chemie," vol. I, Second Supplement, pages 113 and 127.

Mousseron et al. Compt. rend., vol. 214, pages 881-3 (1942).

Prins "Jour. fur Praktische Chemie," vol. 197 (1914), pages 414 to 424.

"Outlines of Organic Chemistry," pages 38, 39, 40.

Degering et al (1939) pages 54, 55, 56.

Skita "Ber. Deut. Chem. Ges.," vol. 48, page 1694 (1915).

Granger "Comptes Rendus," vol. 208, pages 1500-02 (1939).

Henry "Comptes Rendus," vol. 143, page 497 (1906).